(12) United States Patent
Siorek et al.

(10) Patent No.: US 6,732,287 B1
(45) Date of Patent: May 4, 2004

(54) METHOD FOR PROCESSING DYNAMICALLY ALLOCATED TIMERS IN A REAL TIME OPERATING SYSTEM

(75) Inventors: Timothy Siorek, Newbury, OH (US); Stephen Laitinen, Painesville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 550 days.

(21) Appl. No.: 09/599,271

(22) Filed: Jun. 22, 2000

(51) Int. Cl.[7] ................................................ G06F 1/14
(52) U.S. Cl. ...................................... 713/500; 713/502
(58) Field of Search ................................ 713/400, 500, 713/502; 714/55; 377/107; 364/484

(56) References Cited

U.S. PATENT DOCUMENTS

| | | | |
|---|---|---|---|
| 5,138,707 A | | 8/1992 | Haller et al. |
| 5,253,179 A | * | 10/1993 | Rickett ........................ 702/106 |
| 5,491,815 A | * | 2/1996 | Basso et al. ................. 713/502 |
| 5,758,137 A | * | 5/1998 | Armstrong, Jr. et al. .... 713/502 |
| 5,850,179 A | * | 12/1998 | Holmlund et al. ........... 340/518 |
| 6,115,826 A | * | 9/2000 | Kinkade ...................... 713/502 |
| 6,128,318 A | * | 10/2000 | Sato ............................. 370/503 |
| 6,349,388 B1 | * | 2/2002 | Russell ........................ 713/502 |
| 6,505,304 B1 | * | 1/2003 | Ozawa ........................ 713/600 |

FOREIGN PATENT DOCUMENTS

WO      WO-96-34329      * 10/1996

* cited by examiner

Primary Examiner—Thomas Lee
Assistant Examiner—Paul Yanchus, III
(74) Attorney, Agent, or Firm—Amin & Turocy LLP; Alexander M. Gerasimow; R. Scott Speroff

(57) ABSTRACT

A method and system for processing timers are presented in which a plurality of unordered timer lists may be kept according to timer duration. At least one timer list is processed selectively according to a counter associated with the timer list. The method and system reduce the processing overhead associated with timers via the selective processing of the list, and further result in little or no overhead increase as the number of active timers increases. A system is also provided for processing timers, which may include multiple timer lists.

21 Claims, 17 Drawing Sheets

| MEDIUM DURATION TIMER LIST |
|---|
| MTC = 3 |
| MTSTLP = 0 |
| MDTTV 1 = 17 |
| MDTTV 2 = 19 |
| MDTTV 3 = 3 |
| MDTTV 4 = 5 |
| |

FIG. 8a

| MEDIUM DURATION TIMER LIST |
|---|
| MTC = 2 |
| MTSTLP = 1 |
| MDTTV 1 = 17 |
| MDTTV 2 = 19 |
| MDTTV 3 = 3 |
| MDTTV 4 = 5 |
| |

FIG. 8b

| MEDIUM DURATION TIMER LIST |
|---|
| MTC = 1 |
| MTSTLP = 2 |
| MDTTV 1 = 17 |
| MDTTV 2 = 19 |
| MDTTV 3 = 3 |
| MDTTV 4 = 5 |
| |

FIG. 8c

| MEDIUM DURATION TIMER LIST |
|---|
| MTC = 0 |
| MTSTLP = 3 |
| MDTTV 1 = 17 |
| MDTTV 2 = 19 |
| MDTTV 3 = 3 |
| MDTTV 4 = 5 |
| |

FIG. 8d

| MEDIUM DURATION TIMER LIST |
|---|
| MTC = 2 |
| MTSTLP = 0 |
| MDTTV 1 = 14 |
| MDTTV 2 = 16 |
| |
| MDTTV 4 = 2 |
| |

FIG. 8e

| MEDIUM DURATION TIMER LIST |
|---|
| MTC = 1 |
| MTSTLP = 1 |
| MDTTV 1 = 14 |
| MDTTV 2 = 16 |
| |
| MDTTV 4 = 2 |
| |

FIG. 8f

| MEDIUM DURATION TIMER LIST |
|---|
| MTC = 0 |
| MTSTLP = 2 |
| MDTTV 1 = 14 |
| MDTTV 2 = 16 |
| ⋮ |
| MDTTV 4 = 2 |
| |

FIG. 8g

| MEDIUM DURATION TIMER LIST |
|---|
| MTC = 12 |
| MTSTLP = 0 |
| MDTTV 1 = 12 |
| MDTTV 2 = 14 |
| |
| |

FIG. 8h

| MEDIUM DURATION TIMER LIST |
|---|
| MTC = 12 |
| MTSTLP = 0 |
| MDTTV 1 = 12 |
| MDTTV 2 = 14 |
| ⋮ |
| MDTTV 5 = 16 |
| |

FIG. 8i

| MEDIUM DURATION TIMER LIST |
|---|
| MTC = 11 |
| MTSTLP = 1 |
| MDTTV 1 = 12 |
| MDTTV 2 = 14 |
| |
| MDTTV 5 = 16 |
| |

FIG. 8j

| MEDIUM DURATION TIMER LIST |
|---|
| MTC = 4 |
| MTSTLP = 1 |
| MDTTV 1 = 12 |
| MDTTV 2 = 14 |
| |
| MDTTV 5 = 16 |
| MDTTV 6 = 5 |

FIG. 8k

| MEDIUM DURATION TIMER LIST |
|---|
| MTC = 4 |
| MTSTLP = 1 |
| MDTTV 1 = 12 |
| |
| MDTTV 5 = 16 |
| MDTTV 6 = 5 |

FIG. 8l

US 6,732,287 B1

METHOD FOR PROCESSING DYNAMICALLY ALLOCATED TIMERS IN A REAL TIME OPERATING SYSTEM

TECHNICAL FIELD

The present invention relates to the art of timer processing, and more particularly to a method for processing dynamically allocated timers in a real time operating system.

BACKGROUND OF THE INVENTION

Most real time processing applications employ dynamically allocated timers for various purposes. In communications processing applications, for example, timers are utilized to verify that messages are processed in a reasonable amount of time. Dynamically allocated timers are activated and deactivated as the need for them arises while communications and real time data are being processed.

Dynamic timers include watchdog timers as well as timers which run to completion. Watchdog timers are started, and then generally retriggered frequently before timeout. These timers may be useful for ensuring a program or other activity performs some action before the timer expires. For example, a program may activate a watchdog timer prior to calling a subroutine, and may retrigger the watchdog timer upon return from the subroutine. If the subroutine runs normally, the watchdog is retriggered before it times out. However, if the subroutine gets caught in an endless loop situation, or otherwise does not finish in a reasonable time, the timer will time out or expire. The timer may be configured to alert the program to the excessive time taken by the subroutine or to take some other remedial action.

Other timers are started, run to completion, and then are either deactivated or restarted. These timers may be used in a program to ensure that an external event has completed. As an example, it may be desirable to read a data value from an analog to digital converter every 20 milliseconds. In this situation, a timer may be employed to notify a program to perform a data read from the converter at the expiration of a 20 millisecond timer. The timer may be restarted each time it expires in order to provide a periodic signal to the program.

Dynamically allocated timers are usually based on timing signals from clocks or other system components. A timeout duration associated with a timer may be expressed in counts, which represent an integer number of such system timing signals. For example, a microprocessor or other real time processing system may include a free running hardware timer which provides a signal to an operating system or other program, every 1 millisecond. The program may execute a timer processing routine every time the free running timer provides a signal. Timers can be activated by placing an integer count value in a memory register, representing the timer duration in milliseconds. Each time the timer service routine runs, the count values for the active timers can be decremented, and when the count value reaches zero, the timer has expired or timed out. Appropriate action can then be taken.

Several methods of processing timers have heretofore been implemented in real time processing systems. Generally, the active timers are placed into an active timer list, which may include a timer number or other identifier, a timer duration count (usually expressed as an integer), and a pointer to a service routine to be processed if and when the timer expires. The list may be unsorted or may be sorted according to duration, wherein the list must be sorted each time a new timer is activated. Whether sorted or unsorted, each time the timer processing routine runs (e.g., each time the free running timer provides a signal), the timer duration count value for each timer in the list must be decremented. If any of the count values reach zero, the timers associated therewith have timed out or expired, and the service routine associated with those timers is executed.

Where the list is unsorted, each count value in the list must be interrogated every time the timer processing routine runs, to determine if any timer has timed out. Alternatively, where the list is sorted in advance (e.g., each time a timer is added to the list) according to timer duration, only the first count value must be checked each time the timer processing routine runs. If the first count value is non-zero, no timers have timed out, and the processing is complete. However, if the first timer has timed out, the next count value in the list must be tested. This continues until a non-zero value is found, at which time the timer processing routine is finished.

Timer processing involves system overhead. Such overhead includes processing time while the timer processing routine is running, as well as when timers are added, retriggered, deleted, or when timers time out. Sorted lists require less processing overhead than unsorted lists during the timer processing routine, but involve high overhead when timers are added, because the list must be resorted. Unsorted lists require somewhat less overhead when timers are added, but greater overhead during the timer processing routine. In either case, the timer processing routine must decrement each count value entry every time the timer processing routine runs, and consequently, the processing overhead increases with the number of entries in the list.

Another previous timer processing method includes maintaining a counter which is incremented each time the timer processing routine is run. When a timer is added to the list (e.g., activated), the counted value is added to the timer duration count value for the new timer, and the result is placed in the list. Each time the timer processing routine runs, each entry in the list is compared with the current counter value, and when they are equal, the timer has timed out. This method does not require decrementing timer list entries each time the timer processing routine runs, however, the overhead is increased when timers are added to the list. Thus, conventional timer processing methods generally require greater processing time as the number of active timers increases, both during the timer processing routine, and when new timers are activated. However, it is precisely when the most timers are active, that the least timer processing overhead is desired.

Dynamically allocated timers in a real time processing environment may be of many different durations. Short duration timers are generally run to completion timers, whereas medium and long duration timers are a mix of run to completion timers and watchdog type timers. Conventional timer processing methods are somewhat efficient for handling timers of a certain duration and inefficient for other duration timers. Due to the dynamic environment of most real time processing applications, it is impossible to predict the mix of short, medium, and long duration timers which may be active at any given time. For example, in communication processing systems, messages from external devices may randomly occur in large numbers at certain times. Accordingly, conventional methods are less than optimal for efficiently processing timers in many real time applications.

SUMMARY OF THE INVENTION

In accordance with the present invention, there is provided a method of processing dynamically allocated timers in a real time processing system which requires minimal system overhead in processing both run to completion and/or watchdog type timers, of a variety of durations. The invention further provides reduced overhead associated with both timer processing routines, and with activation or addition of new timers, which is achieved for large as well as small numbers of active timers. The present invention is therefore ideally suited to real time processing applications, such as communication processing systems, wherein timers of a variety of durations are dynamically allocated randomly, and sometimes in large numbers. The invention finds further utility in association with operating systems. A method for processing dynamically allocated timers is provided, having low processing overhead for the common and frequent operations while maintaining a low and fairly constant processing overhead as the number of active timers increases.

In accordance with one aspect of the invention, separate unordered timer lists are maintained according to timer duration. This allows for the possibility of different timer processing based on the unique problems associated with timers of different duration. In this regard, one or more thresholds may be associated with a timer list, and new timers are added to the list based on a comparison of the new timer timeout duration with the threshold or thresholds associated with that list.

Another aspect of the invention provides for associating a counter with an unordered timer list. As timers are added to the list, the counter is set to the shortest duration timer in the list, and is decremented each time a timer processing routine runs. When the counter reaches zero, a timer list service task may be executed or enabled, in which the entries in the timer list are checked to determine which, if any, timers have expired or timed out. The use of the counter eliminates the need for decrementing, interrogating, comparing, or otherwise checking each list entry each time the timer processing routine runs, as was common in conventional methods. This results in decrease of the timer processing overhead incurred at each timer clock. Moreover, the overhead associated with timer processing remains low, even as the number of active timers increases. The invention thus provides the reduced overhead of a timer list having a single countdown variable as well as the reduced overhead of keeping the timers in an unordered list. The processing overhead is further reduced because the timers may be sorted into multiple lists of similar timer durations.

Still another aspect of the present invention provides for associating a scaling variable with a timer list, which is increment each time a timer processing routine is run, and which is set to zero when a timer list service task associated with the list is executed or run. Once timer entries are entered into a timer list, they are not incremented or decremented or otherwise modified, until the timer list service task runs. The scaling variable therefore represents the time since the associated timer list service task was last run, and may be used to normalize the timer timeout values relative to a known, fixed point in time. Referencing all the timers in a timer list to a fixed point in time provides for minimal overhead in adding and/or removing timers from the list.

According to yet another aspect of the invention, a method for processing timers having timer duration counts associated therewith is provided. The method comprises providing a plurality of timer lists, at least one of which having a service task, a counter, and a scaling variable associated therewith. New timers are added to one of the lists based on duration. The timer list entries are scaled based on the scaling variable, and a timer service routine is periodically executed. The service routine selectively calls, executes, or enables a timer list service task based on the counter. The method thus reduces the processing associated with prior methods and systems which required processing or servicing each entry in a timer list at each timer interrupt.

According to still another aspect of the present invention, a method is provided for processing a timer list having a service task, a counter, and timer duration counts associated therewith, comprising periodically executing a timer service routine, and selectively executing the service task based on the counter.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4b is a flow diagram illustrating further aspects of the method for processing timers of FIG. 4a;

FIG. 8a is a schematic diagram illustrating an exemplary method for processing timers in accordance with another aspect of the invention;

FIG. 8b is a schematic diagram illustrating an exemplary method for processing timers in accordance with another aspect of the invention;

FIG. 8c is a schematic diagram illustrating an exemplary method for processing timers in accordance with another aspect of the invention;

FIG. 8d is a schematic diagram illustrating an exemplary method for processing timers in accordance another aspect of the invention;

FIG. 8e is a schematic diagram illustrating an exemplary method for processing timers in accordance with another aspect of the invention;

FIG. 8f is a schematic diagram illustrating an exemplary method for processing timers in accordance with another aspect of the invention;

FIG. 8g is a schematic diagram illustrating an exemplary method for processing timers in accordance with another aspect of the invention;

FIG. 8h is a schematic diagram illustrating an exemplary method for processing timers in accordance with another aspect of the invention;

FIG. 8i is a schematic diagram illustrating an exemplary method for processing timers in accordance with another aspect of the invention;

FIG. 8j is a schematic diagram illustrating an exemplary method for processing timers in accordance with another aspect of the invention;

FIG. 8k is a schematic diagram illustrating an exemplary method for processing timers in accordance with another aspect of the invention;

FIG. 8l is a schematic diagram illustrating an exemplary method for processing timers in accordance with another aspect of the invention;

DESCRIPTION OF THE PREFERRED EMBODIMENTS

Figure 1:
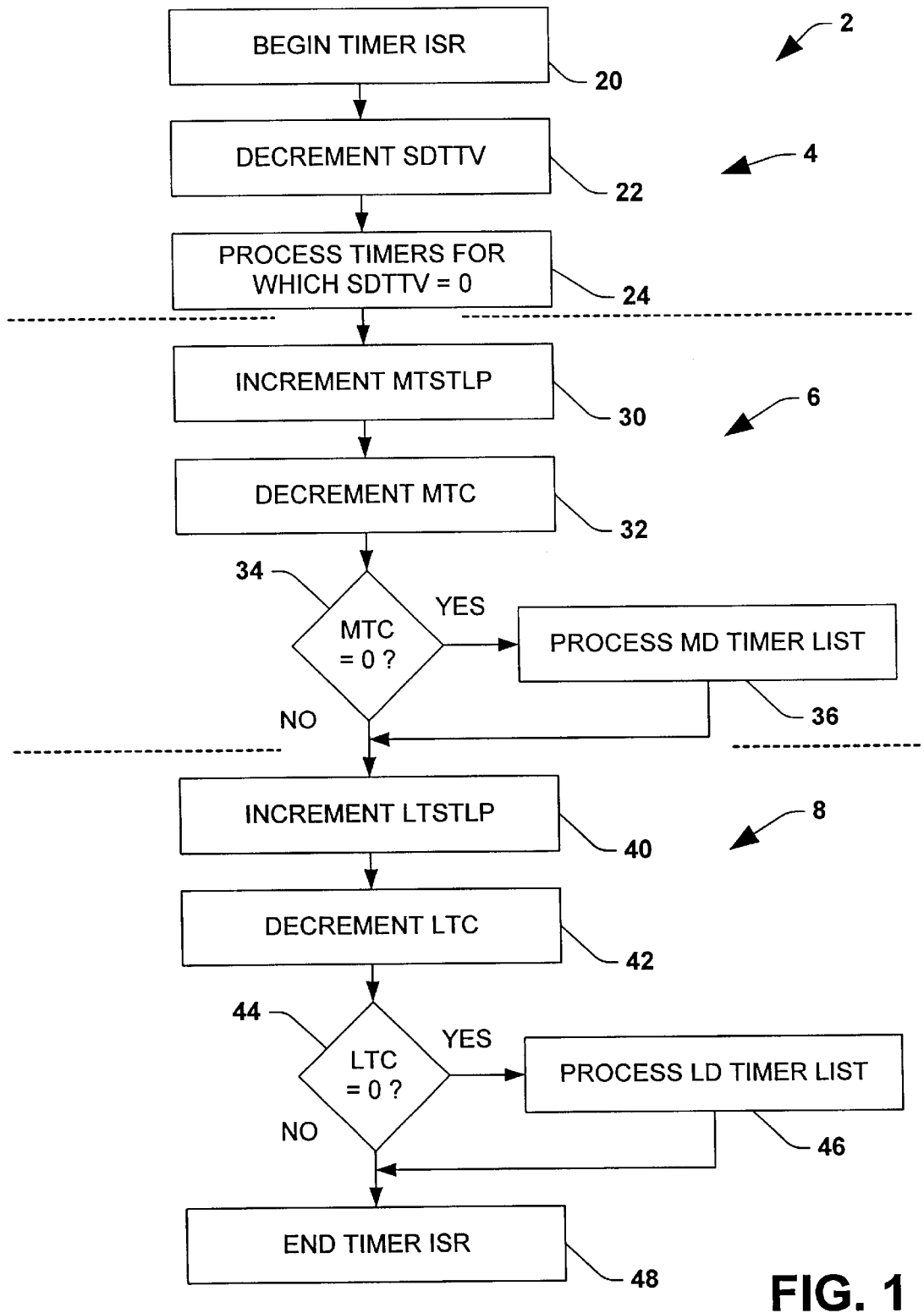
FIG. 1 is a flow diagram illustrating a method for processing timers according to the present invention.

The various aspects of the present invention will now be described with reference to the drawings, wherein like reference numerals are used to refer to like elements throughout. The invention provides a method for processing dynamically allocated timers in a real time processing system having low processing overhead for the common and frequent operations associated with timers as well as low and fairly constant processing overhead as the number of active timers increases. This advantageously provides for system performance improvements over heretofore existing methods and systems in which tradeoffs had to be made between processing overhead and activation/deactivation overhead, and where overhead increase as a function of the number of active timers was inherent.

Referring now to FIG. 1, a method is illustrated for processing timers, including a timer interrupt service routine 2 having sections 4, 6, and 8 for processing short, medium, and long duration timers (not shown), respectively. The short, medium, and long duration timers are represented by entries in associated timer lists (not shown), as described in greater detail hereinafter. The timer interrupt service routine 2 may be periodically executed, for example, in response to a free running timer 10 adapted to cause a hardware interrupt to a microprocessor or other real time processing device 12 as illustrated in FIG. 2. The plurality of timer groupings allows the interrupt service routine 2 to perform different operations on timer lists of different durations, and thereby to reduce the overhead associated with timer processing. The interrupt service routine 2 (ISR) begins at step 20, after which the short duration timer timeout values (SDTTVs) associated with active short duration timers are decremented in step 22. Thereafter, all such short duration timers for which the SDTTV is zero are processed in step 24, as they have timed out or expired.

With the short duration timers thus processed in section 4, the medium duration timer processing section 6 begins at step 30 where a medium time since timer list processed variable (MTSTLP) is incremented, as discussed in greater detail hereinafter. In step 32 a medium timer counter (MTC) is decremented, whereafter a zero check is performed on the MTC in decision step 34. If the MTC is zero, the medium duration timer list (not shown) is processed in step 36 as described further below and the medium timer processing section 6 is completed. Otherwise, no medium timers have timed out, and the long duration timers (not shown) are processed in section 8.

Long duration timer processing begins at step 40 where a long time since timer list processed variable (LTSTLP) is incremented, after which a long timer counter (LTC) is decremented at step 42. If the LTC is non-zero at a decision step 44, the ISR 2 is completed at step 48. Otherwise, the long duration timer list (not shown) is processed at step 46 before the ISR completes at step 48. The method illustrated in FIG. 1 thus provides for the possibility of different treatment or processing of timers according to the timer durations, and for the selective processing of at least one timer list depending on the value or status of a variable such as a counter. The present invention thereby reduces processing time associated with conventional timer lists and methods, as well as reduces the processing overhead associated with activating or adding new timers to the system, as discussed in greater detail infra.

Figure 2A:
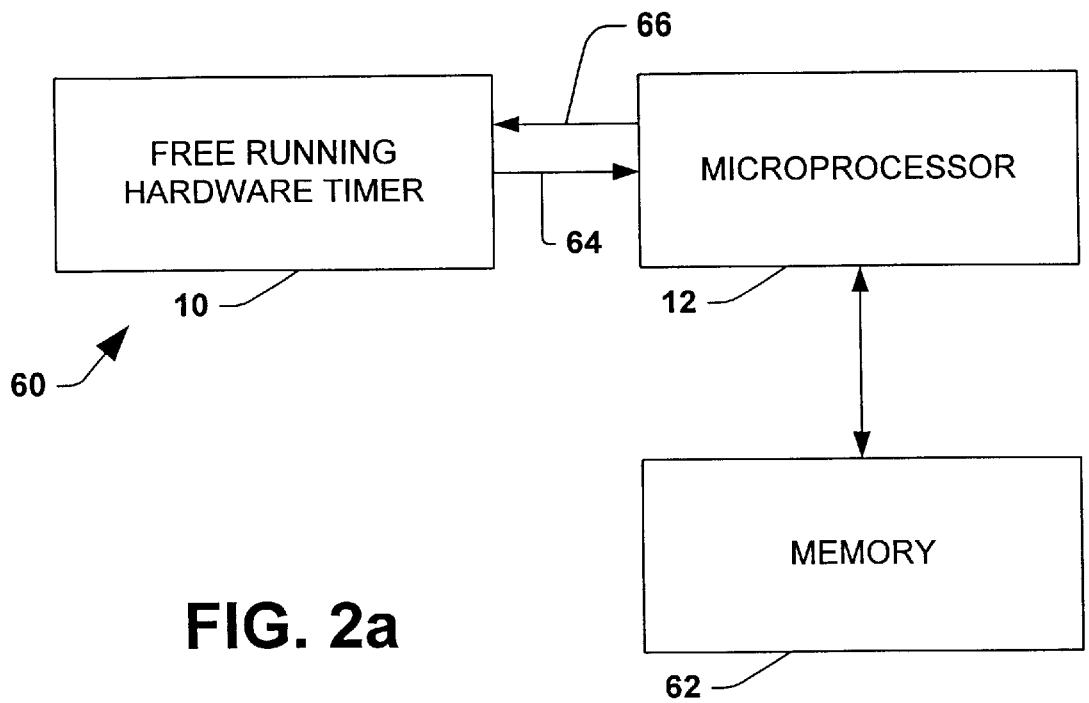
FIG. 2a is a block diagram, schematically illustrating a real time processing system in which the various aspects of the present invention may be implemented.

Referring now to FIG. 2a, a system 60 is illustrated wherein the methods of the present invention may be carried out, including a microprocessor 12, a free running hardware timer 10, and a memory 62. The microprocessor 12 may be programmed to control and operate the various components within the system 60 in order to carry out the various functions described herein. In this regard, the system 60 may comprise other components for interfacing with external systems and devices, for example, I/O components, communications ports, and the like (not shown). The processor 12 can be any of a plurality of suitable processors, for example, such as the p24T, Pentium 50/75, Pentium 60/90, and Pentium 66/100, Pentium PRO and Pentium 2, Motorola MC68HC16Z1CFC16 and other similar and compatible processors. The manner in which the microprocessor 12 can be programmed to carry out the functions relating to the present invention will be readily apparent to those having ordinary skill in the art based on the description provided herein and thus further discussion related thereto is omitted for sake of brevity.

The memory 62 tied to the microprocessor 12 serves to store program code executed by the microprocessor 12 for carrying out the methods and operating functions of the system 60 as described herein. In particular the memory 62 also serves as a storage medium for the timer lists processed according to the invention, in addition to the programs and data (not shown) associated with the primary function or functions to which the system 60 is dedicated. Such functions may include, for example, industrial control processing, communications processing, and the like. Memory 62 may comprise read only memory (ROM) and/or random access memory (RAM). The ROM may include, among other code, the Basic Input-Output System (BIOS) which controls the basic hardware operations of the system 60. The RAM is the main memory into which the operating system and application programs are loaded, and may further be used for temporary data storage. Power is provided to the processor 12 and other components forming the system 60 from a power system (not shown).

The free running hardware timer 10 is adapted to generate a timing or interrupt signal 64 to the microprocessor 12 at precise time intervals which may then be used by the microprocessor 12 to perform timer related activities. For example, the microprocessor 12 may execute a timer interrupt service routine such as ISR 2 in FIG. 1, in response to a timer interrupt signal 64 (timer clock) from the hardware timer 10. Microprocessor 12 may further provide control or other signals 66 to the hardware timer 10 according to processing or program instructions being executed by the microprocessor 12. While the timer processing functions discussed and illustrated herein may be performed according to a timing signal 64 from a free running hardware timer 10 as illustrated in FIG. 2a, other devices and methods are possible for providing timer processing timing signals. These may include, for example, signals derived by the microprocessor from a system clock (not shown), or from external sources (not shown), and the like, and will be understood by those skilled in the art as falling within the scope of the present invention.

Figure 2B:
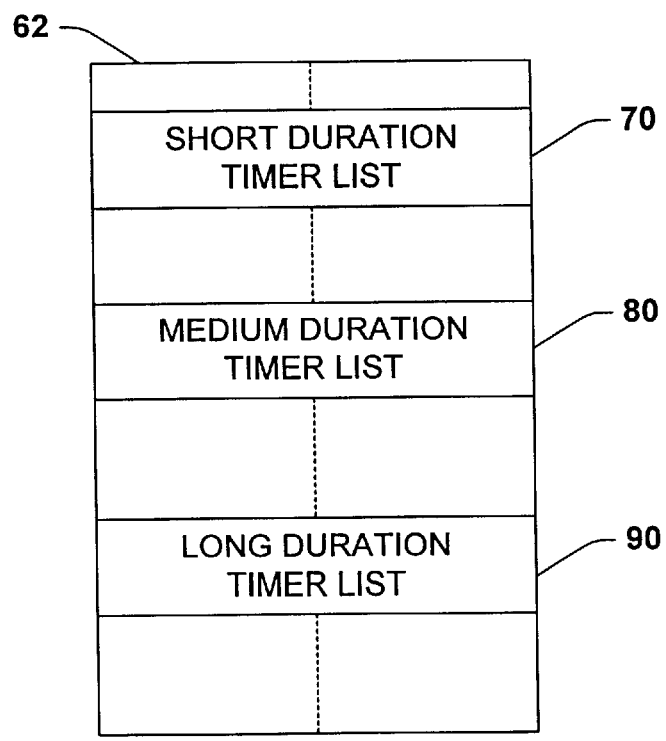
FIG. 2b is a schematic diagram illustrating a portion of memory of the system of FIG. 2a, in which several timer lists are stored.

As illustrated in FIG. 2b, the memory 62 may be used as a storage medium for short duration, medium duration, and long duration timer lists 70, 80, and 90, respectively. A plurality of timer lists are contemplated as within the scope of the present invention, and may comprise more or less than the lists 70, 80, and 90, illustrated and described herein.

Figure 3A:
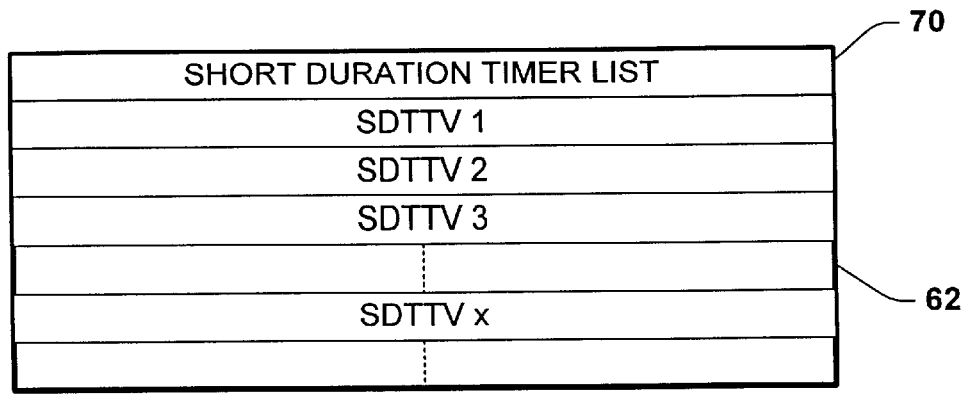
FIG. 3a is a schematic diagram illustrating an exemplary short duration timer list according to one aspect of the invention.
Figure 3B:
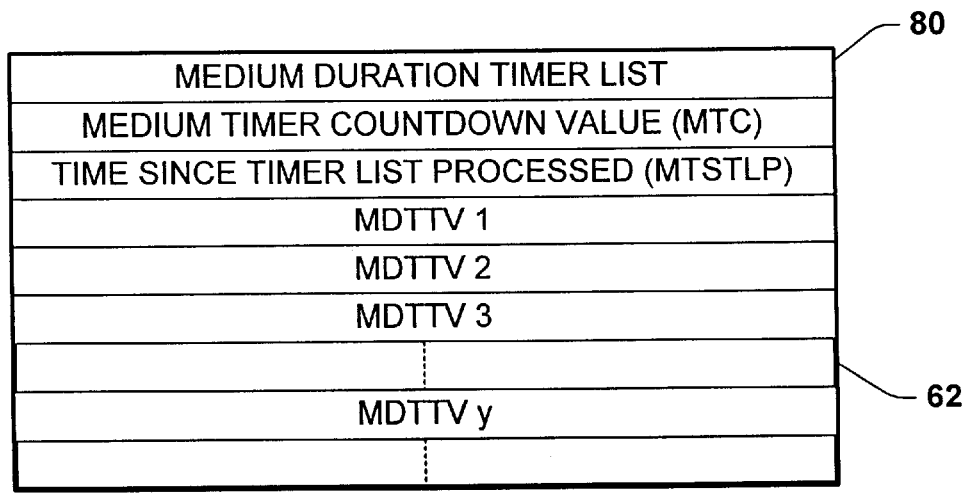
FIG. 3b is a schematic diagram illustrating an exemplary medium duration timer list according to one aspect of the invention.
Figure 3C:
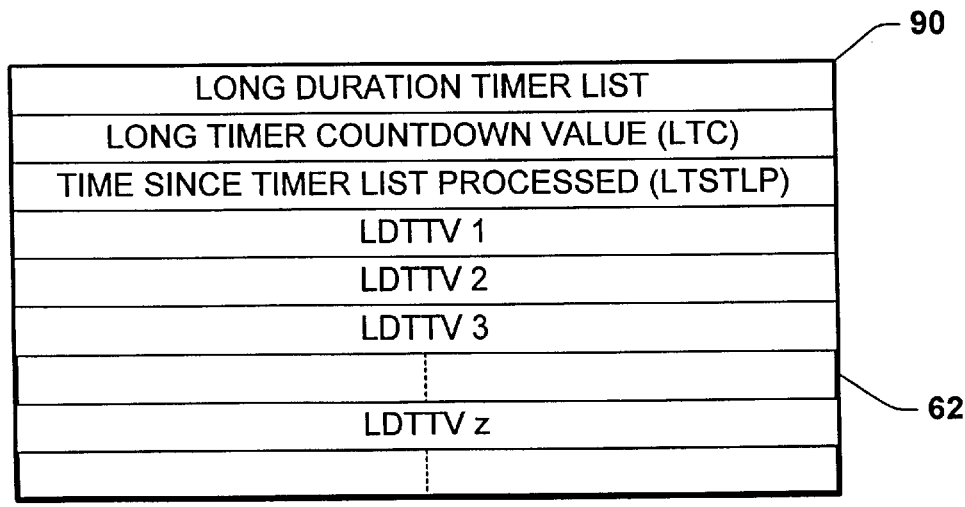
FIG. 3c is a schematic diagram illustrating an exemplary long duration timer list according to one aspect of the invention.

Referring also to FIGS. 3a, 3b, and 3c, the lists 70, 80, and 90 may be comprised of timer entries corresponding to active timers associated with the system 60 and/or programs or other processing associated therewith. In FIG. 3a, the short duration timer list 62 comprises short duration timer timeout value (SDTTV) entries for each active short duration timer. As discussed in greater detail infra, one or more durational thresholds (not shown) may be established for each timer list 70, 80, 90, corresponding to timeout duration time ranges, according to the desired timer processing performance of the system 60.

By this method, the system 60 may add or activate new timers by, among other things, adding a corresponding entry into one of the timer lists based on which duration time range the new timer falls into. As an example, a short duration timer threshold (SDTTH) may be set to one or two increments of the free running hardware timer 10 or other timer clock, and a long duration timer threshold (LDTTH) may be set to one or two seconds. It will be noted that limiting the short duration timer threshold SDTTH to a maximum of 2 ensures that a large percentage of the timers in the short duration timer list will time out and be processed on any given timer tick, thereby reducing unnecessary timer testing overhead for timers that continue running. The thresholds may be expressed as an integer representing the corresponding number of timer interrupt signals 64 from the free running hardware timer 10 of system 60 (timer clocks), as will be discussed further hereinafter.

According to one example, the timer lists 70, 80, and 90 may be constructed such that timers having timeout durations below the short duration timer threshold SDTTH are added to the short duration timer list 70, timers of duration greater than the long duration timer threshold LDTTH are added to the long duration timer list 90, and timers of duration between SDTTH and LDTTH are added to the medium duration timer list 80. Thus, new timers are added to the appropriate timer list according to timer duration, and entries corresponding to the durations are placed in the lists 70, 80, or 90.

The exemplary short duration timer list 70 is illustrated in FIG. 3a has short duration timer timeout values SDTTV for each active short duration timer at any given time. These are illustrated as SDTTV1, SDTTV2, . . . through SDTTVx, where x is an integer. At certain times, there may be no active short duration timers, and hence, no entries in the short duration timer list 70. At other times, there may be many active timers in the list 70. Because timers in the system 60 may be allocated dynamically, the number of entries in each list 70, 80, and 90, may vary greatly over time.

Referring now to FIG. 3b, an exemplary medium duration timer list 80 is illustrated, having a medium timer countdown (MTC) value entry, a time since timer list processed (MTSTLP) value entry, and medium duration timer timeout value (MDTTV) entries MDTTV1, MDTTV2, . . . , MDTTVy, corresponding to the timeout durations for active timers of medium duration. As with the short duration timer list 70, the timer timeout value entries MDTTV may be expressed as integers related to the number of timer interrupt signals 64 (timer clocks) from the hardware timer 10 of system 60. Unlike the short duration timer list 70, the medium duration timer list 80 includes MTC and MTSTLP entries, which allow the processing of the timer list 80 to be performed selectively in a timer interrupt service routine such as ISR 2 of FIG. 1. By this method, the overhead associated with processing medium duration timers may be reduced within the scope of the invention, as discussed infra in association with FIG. 5a.

Referring now to FIG. 3c, an exemplary long duration timer list 90 is illustrated, having a long timer countdown (LTC) value entry, a time since timer list processed (LTSTLP) value entry, and long duration timer timeout value (LDTTV) entries LDTTV1, LDTTV2, . . . , LDTTVz, corresponding to the timeout durations for active timers of long duration. As with the short and medium duration timer lists 70 and 80, the timer timeout value entries LDTTV may be expressed as integers related to the number of timer interrupt signals 64 from the hardware timer 10 of system 60. Similar to the medium duration timer list 80, the long duration timer list 90 includes LTC and LTSTLP entries, which allow the processing of the timer list 90 to be performed selectively in a timer interrupt service routine such as ISR 2 of FIG. 1. By this method, the overhead associated with processing long duration timers may be reduced within the scope of the invention, as will be discussed in association with FIG. 5b infra.

Figure 4A:
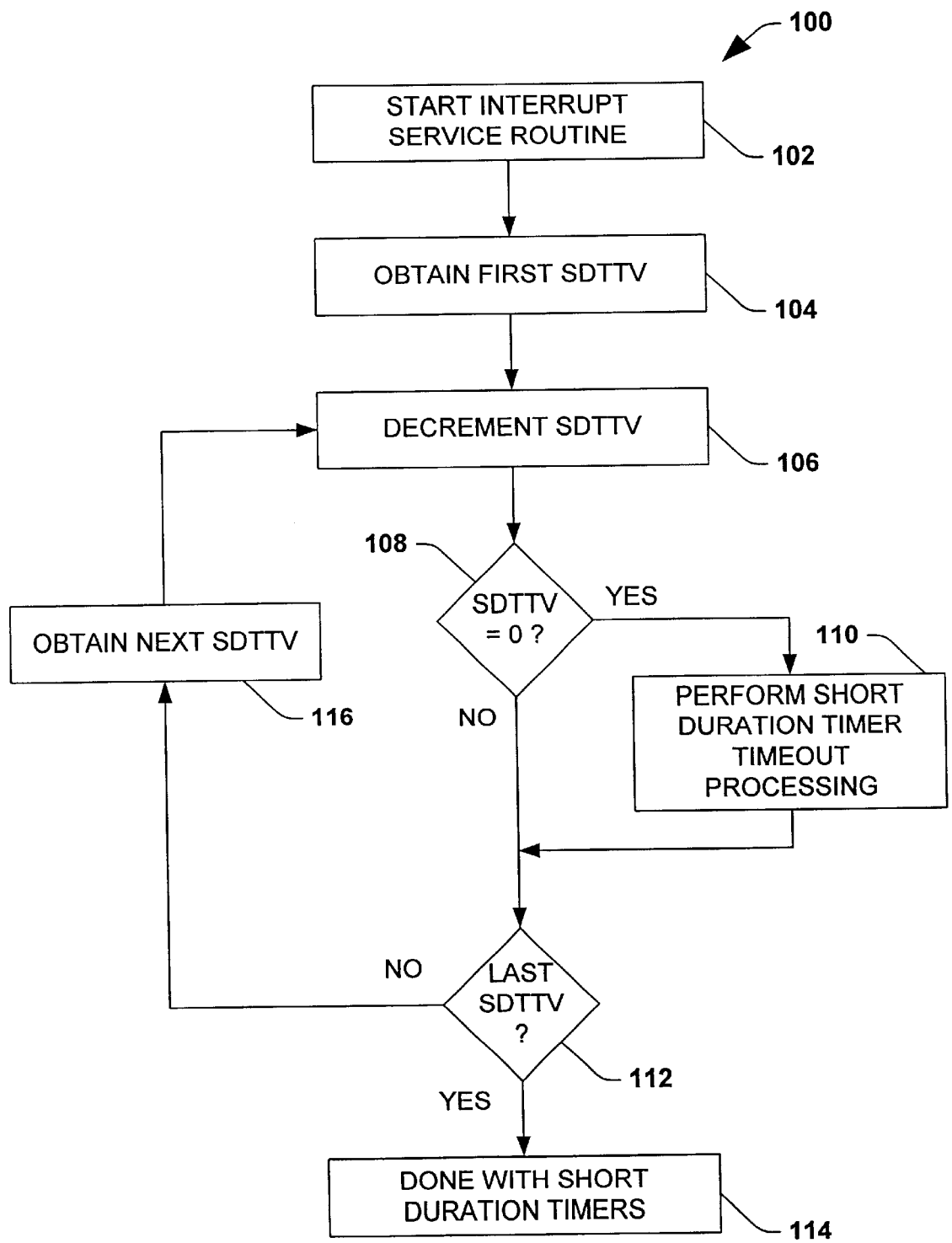
FIG. 4a is a flow diagram illustrating an exemplary method for processing timers according to an aspect of the present invention.
Figure 4B:
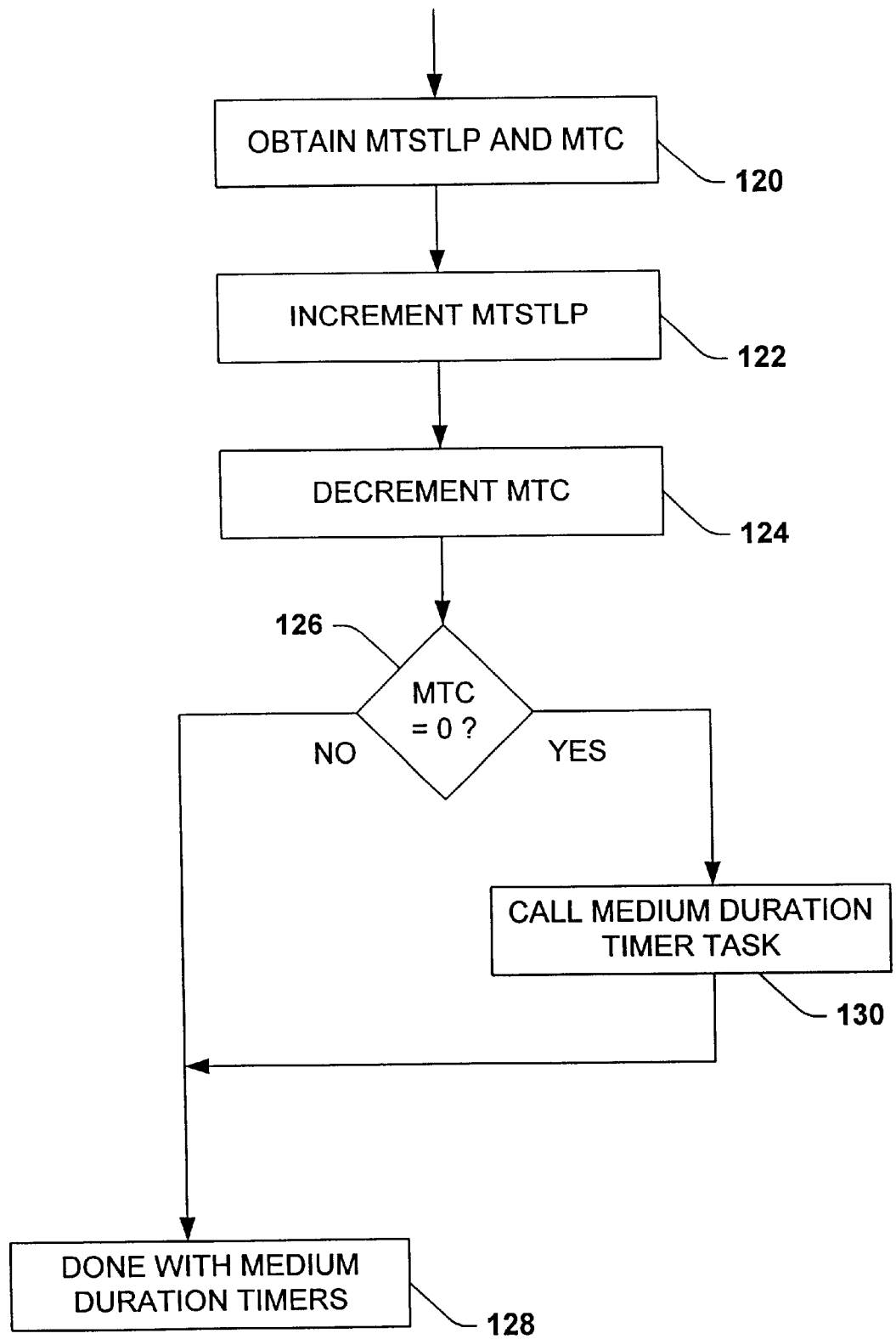
Figure 4C:
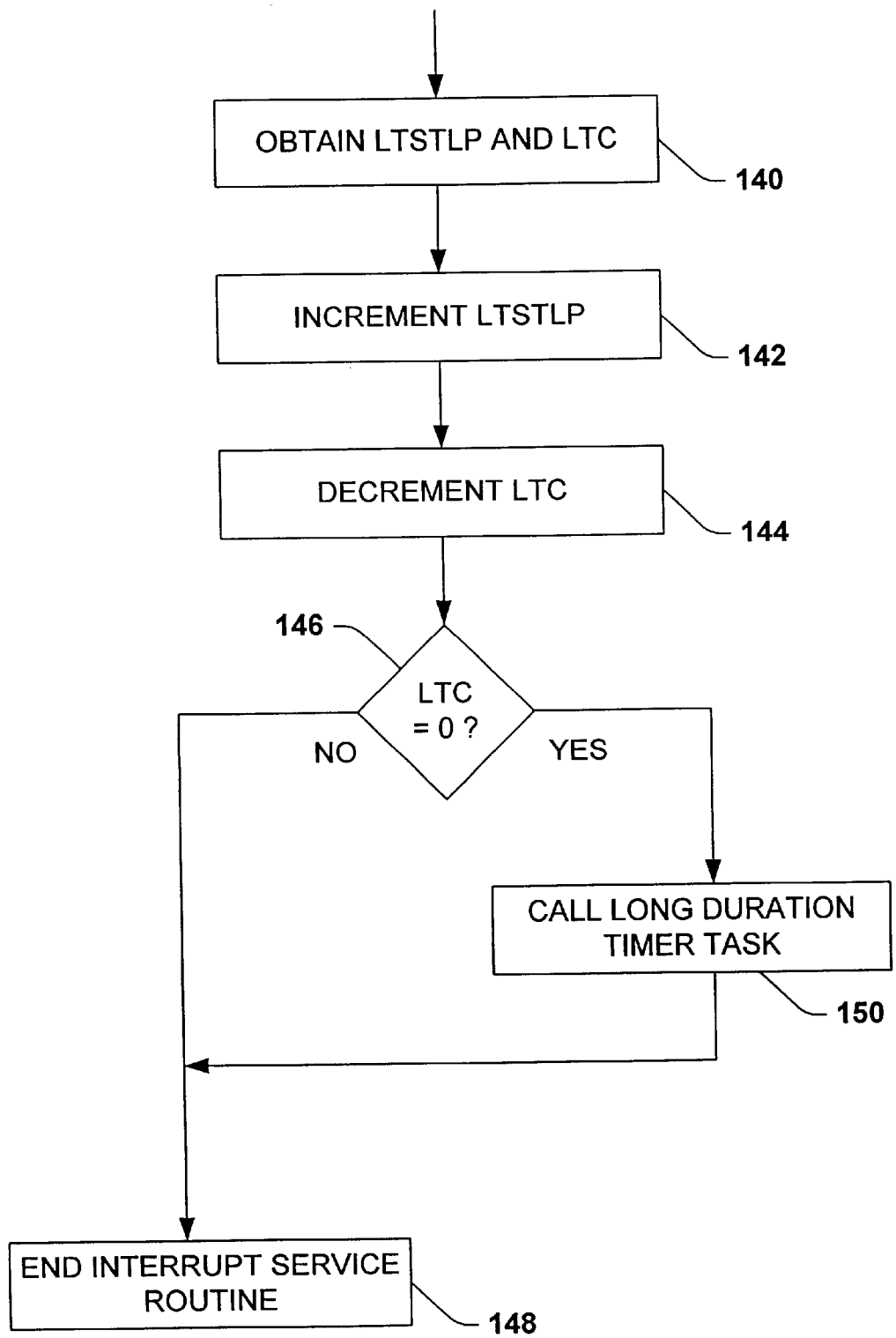
FIG. 4c is a flow diagram illustrating further aspects of the method for processing timers of FIGS. 4a and 4b.

Referring now to FIGS. 4a, 4b, and 4c, an exemplary method 100 is illustrated for processing timers in accordance with the present invention. As discussed supra, the microprocessor 12 of system 60 may execute a timer service routine in response to an interrupt or timing signal such as signal 64 from the free running hardware timer 10. The method 100 of FIGS. 4a, 4b, and 4c begins with the start of a timer interrupt service routine at step 102, after which the first short duration timer timeout value (SDTTV) is obtained at step 104. The SDTTV in this example is obtained from the short duration timer list 70 as illustrated in FIG. 3a. The SDTTV is decremented at step 106, and if the SDTTV is zero at step 108 (the timer associated therewith has timed out or expired), the timeout processing associated with the timer is performed at step 110. It will be appreciated by those skilled in the art that many different processing steps may be desirable when a timer times out, and further discussion thereof is omitted for the sake of brevity. Once the SDTTV has been decremented at step 106 and appropriate processing performed at steps 108 and 110, decision step 112 determines whether the current SDTTV is the last one in the list 70. If so, the processing associated with the short duration timers is completed at step 114. If more unprocessed active timers remain in the short duration timer list 70, the next SDTTV is obtained at step 116, and processing continues via steps 106, 108, 110, and 112 in this fashion until all the short duration timers have been processed.

Thereafter, in FIG. 4b, the medium time since list processed (MTSTLP) and medium timer counter (MTC values are obtained from the medium timer list 80 at step 120. The MTSTLP is incremented at step 122, and the MTC is decremented at step 124, whereafter decision step 126 determines whether MTC is zero. If MTC is non-zero, processing of the medium duration timers is completed at step 128. Only if MTC is zero, is the medium timer list 80 processed at step 130.

Referring now to FIG. 4c, the processing of the long duration timers is similar to that of the medium duration timers. At step 140, the long time since list processed (LTSTLP) and long timer counter (LTC values are obtained from the long timer list 90 at step 140. The LTSTLP is incremented at step 142, and the LTC is decremented at step 144, whereafter decision step 146 determines whether LTC is zero. If LTC is non-zero, processing of the long duration timers is completed at step 148. Only if LTC is zero, is the long timer list 90 processed at step 150. As will be further illustrated in the discussion of FIGS. 5a and 5b infra, the method of FIGS. 4a, 4b, and 4c significantly reduces the processing time associated with active medium and long duration timers due in part to the fact that the timer lists 80 and 90 are only processed when the associated counter (MTC or LTC) reaches zero.

Figure 5A:
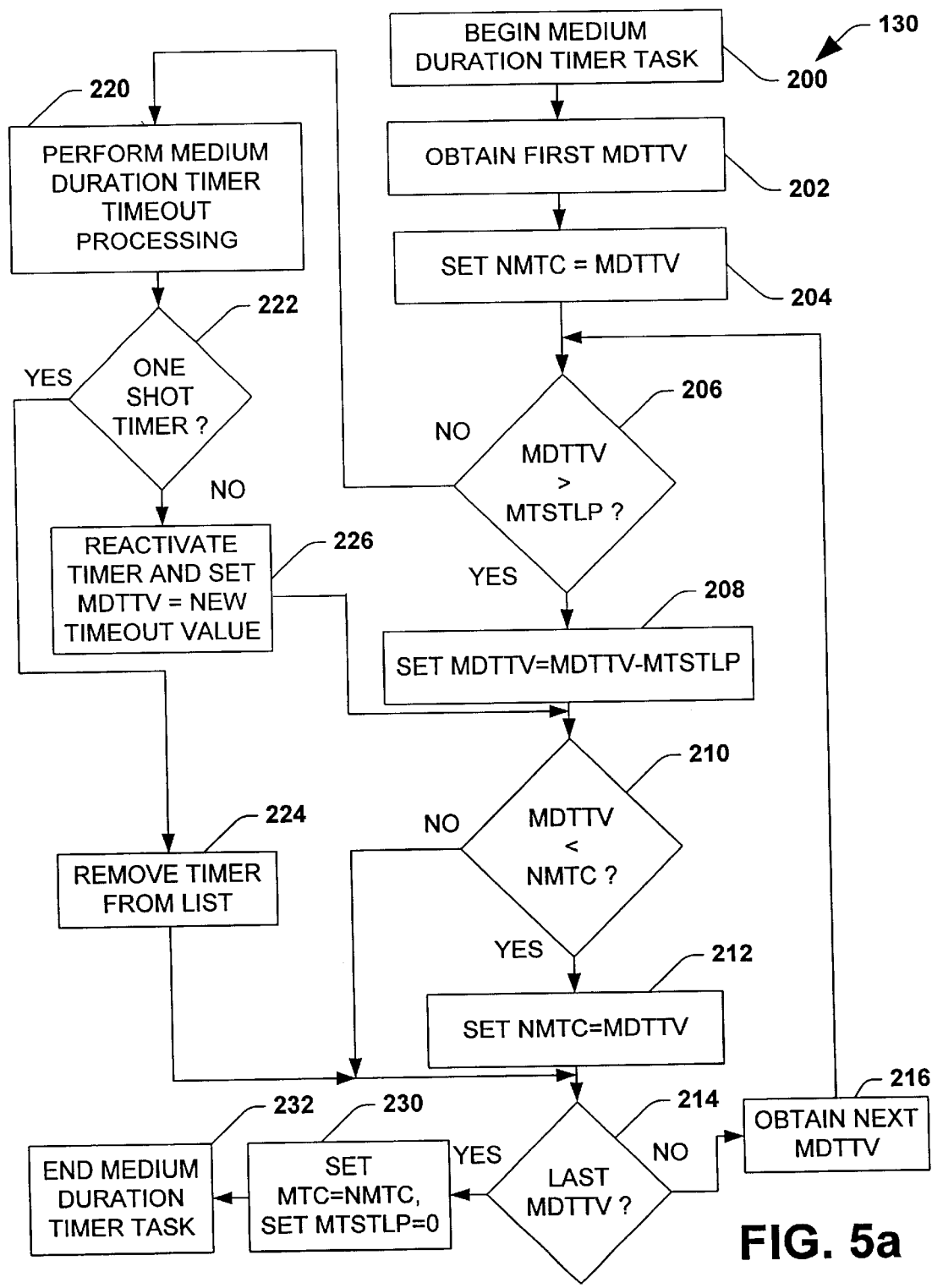
FIG. 5a is a flow diagram illustrating several aspects of an exemplary method for processing timers in accordance with the present invention.

FIG. 5a illustrates an exemplary medium duration timer task 130, which may be selectively called from or enabled by the timer interrupt service routine 100 of FIGS. 4a, 4b, and 4c. In accordance with one aspect of the present invention, the service routine 100 calls or enables the task 130 only when the medium timer counter MTC has reached zero. Task 130 begins at step 200 after which the first MDTTV is obtained at step 202 from the medium duration timer list 80 in memory 62 of FIG. 3b. At step 204, a temporary new medium timer counter variable (NMTC) is set to the value of MDTTV obtained in step 202. Because the task 130 is only run when the medium timer counter MTC reaches zero, a new value for MTC is computed in the medium duration timer task 130 for use by the interrupt service routine 2 after the list has been processed according to the task 130. The NMTC variable is used to determine the new setting for MTC.

If the MDTTV is greater than the medium time since timer list processed value MTSTLP, decision step 206 allows the MTSTLP value to be subtracted from the MDTTV at step 208. According to one aspect of the invention, the MDTTVs in the medium timer list are only updated during execution of the task 130. Each time the timer ISR 100 runs, the MTSTLP is incremented, thus indicating the time since the list was last processed. As discussed further infra, each time the service task 130 runs, the MTSTLP is reset to zero. Prior to being reset to zero, the MTSTLP is subtracted from the timer duration values MDTTV at step 208 to provide a new indication of the remaining time before a timer times out. For example, where a timer MDTTV is 30 when the timer is added to the list, and the MTC does not reach zero for another 12 executions of the ISR 100, the MTSTLP will be 12, and the MDTTV will remain at 30 when the timer service task 130 runs. In this example, the MDTTV will be set to 18 (30–12) at step 208. It will be appreciated that if the MDTTV is less than or equal to the MTSTLP at step 206, the timer has expired or timed out, and appropriate servicing is performed as described in greater detail hereinafter.

Once the MTSTLP has been subtracted from the non-expired timer MDTTV at step 208, decision step 210 determines whether the MDTTV is less than NMTC, and if so NMTC is set to MDTTV at step 212. In either case, decision step 214 determines whether the last MDTTV in the list has been processed. If not, the next MDTTV is obtained at step 216, and execution proceeds to step 206 as described above. All timers for which MDTTV is greater than MTSTLP have not timed out yet, and are processed through steps 206, 208, 210, and 212. Step 208 ensures that the timer duration values MDTTV for these timers are updated based on the time since the list was last processed, and steps 210 and 212 ensure that the NMTC is set to the shortest duration timer remaining in the list.

If the MDTTV is less than or equal to the MTSTLP at step 206, the timer has expired or timed out. Any service routine or other processing associated with the expired timer is then performed at step 220, whereafter decision step 222 determines whether the expired timer was a one shot timer. If so, the timer is removed from the medium duration timer list 80 at step 224. Otherwise, the timer is a free running timer, and is reactivated at step 226 by setting MDTTV to the new timeout value for the timer. The new MDTTV is then compared with NMTC at step 210, and NMTC is updated at step 212 if MDTTV is less than NMTC. Once all the MDTTVs have been processed for the medium duration timer list 80, decision step 214 transfers execution to step 230 where MTC is set to the NMTC value, and MTSTLP is reset to zero. This method ensures that all timers in the list which have timed out are processed at steps 220, 222, 224, and 226, and that the MTC is set to the value of the lowest MDTTV remaining in the list before the medium duration timer task 130 ends at step 232. Thus, the method ensures that the medium timer list 80 need not be processed again for the number of ISR executions (e.g., the number of timer clocks) equal to MTC. This aspect of the present invention significantly reduces the processing overhead associated with the medium duration timers, compared with the prior methods wherein each timer entry in a timer list had to be decremented each time the ISR was executed (e.g., at each timer clock).

Figure 5B:
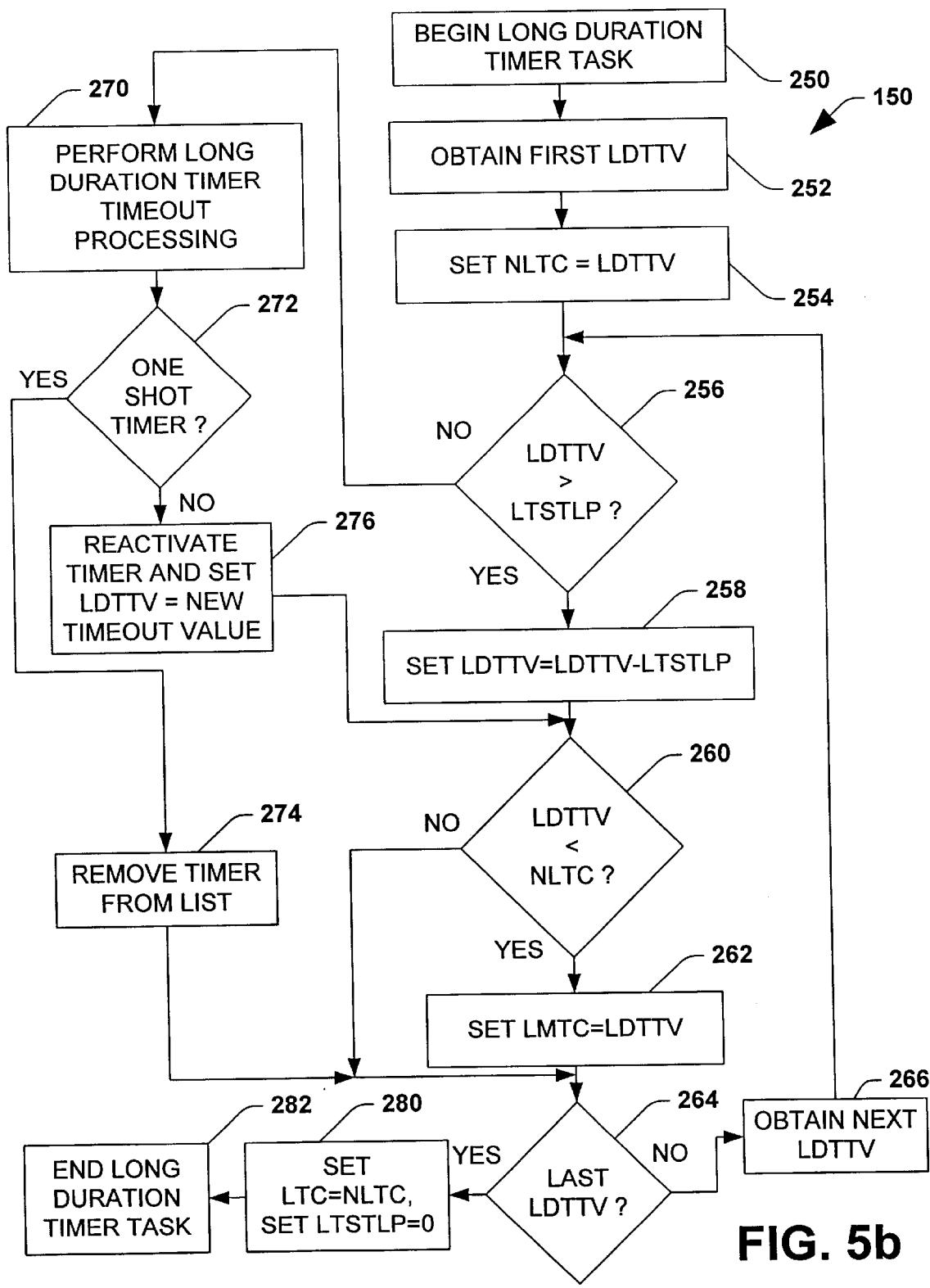
FIG. 5b is a flow diagram illustrating several aspects of an exemplary method for processing timers in accordance with the invention.

Referring now to FIG. 5b, a similar method is used to process the long duration timer list 90 via the long duration timer task 150 called from or enabled by the ISR 100. According to one aspect of the present invention, the service routine 100 calls or enables the task 150 only when the long timer counter LTC has reached zero. Task 150 begins at step 250 after which the first LDTTV is obtained at step 252 from the long duration timer list 90 in memory 62 of FIG. 3c. At step 254, a temporary new long timer counter variable (NLTC) is set to the value of LDTTV obtained in step 252. Because the task 150 is only run when the long timer counter LTC reaches zero, a new value for LTC is computed in the long duration timer task 150 for use by the interrupt service routine 2 after the list has been processed according to the task 150. The NLTC variable is used to determine the new setting for LTC.

If the LDTTV is greater than the long time since timer list processed value LTSTLP, decision step 256 allows the LTSTLP value to be subtracted from the LDTTV at step 258. According to one aspect of the invention, the LDTTVs in the long timer list are only updated during execution of the task 150. Each time the timer ISR 100 runs, the LTSTLP is incremented, thus indicating the time since the list was last processed. As discussed further infra, each time the service task 150 runs, the LTSTLP is reset to zero. Prior to being reset to zero, the LTSTLP is subtracted from the timer duration values LDTTV at step 258, in order to provide a new indication of the remaining time before a timer times out.

Once the LTSTLP has been subtracted from the non-expired timer LDTTV at step 258, decision step 260 determines whether the LDTTV is less than NLTC, and if so NLTC is set to LDTTV at step 262. In either case, decision step 264 determines whether the last LDTTV in the list 90 has been processed. If not, the next LDTTV is obtained at step 266, and execution proceeds to step 256 as described above. All timers for which LDTTV is greater than LTSTLP have not timed out yet, and are processed through steps 256, 258, 260, and 262. Step 258 ensures that the timer duration values LDTTV for these timers are updated based on the time since the list 90 was last processed, and steps 260 and 262 ensure that the NLTC is set to the shortest duration timer remaining in the list 90.

If the LDTTV is less than or equal to the LTSTLP at step 256, the timer has expired or timed out. Any service routine or other processing associated with the expired timer is then performed at step 270, after which a decision step 272 determines whether the expired timer was a one shot timer. If so, the timer is removed from the long duration timer list 90 at step 274. Otherwise, the timer is a free running timer, and is reactivated at step 276 by setting LDTTV to the new timeout value for the timer. The new LDTTV is then compared with NLTC at step 260, and NLTC is updated at step 262 if LDTTV is less than NLTC. Once all the LDTTVs have been processed for the long duration timer list 90, decision step 264 transfers execution to step 280 where LTC is set to the NLTC value, and LTSTLP is reset to zero. This method ensures that all timers in the list which have timed out are processed at steps 270, 272, 274, and 276, and that the LTC is set to the value of the lowest LDTTV remaining in the list before the long duration timer task 150 ends at step 282. Thus, the method ensures that the long timer list 90 need not be processed again for the number of ISR executions equal to LTC. This aspect of the present invention significantly reduces the processing overhead associated with the long duration timers, compared with the prior methods wherein each timer entry in a timer list had to be decremented each time the ISR was executed. Moreover, the method and system of the present invention provide timer processing which has little additional overhead as the number of timers increases.

Figure 6A:
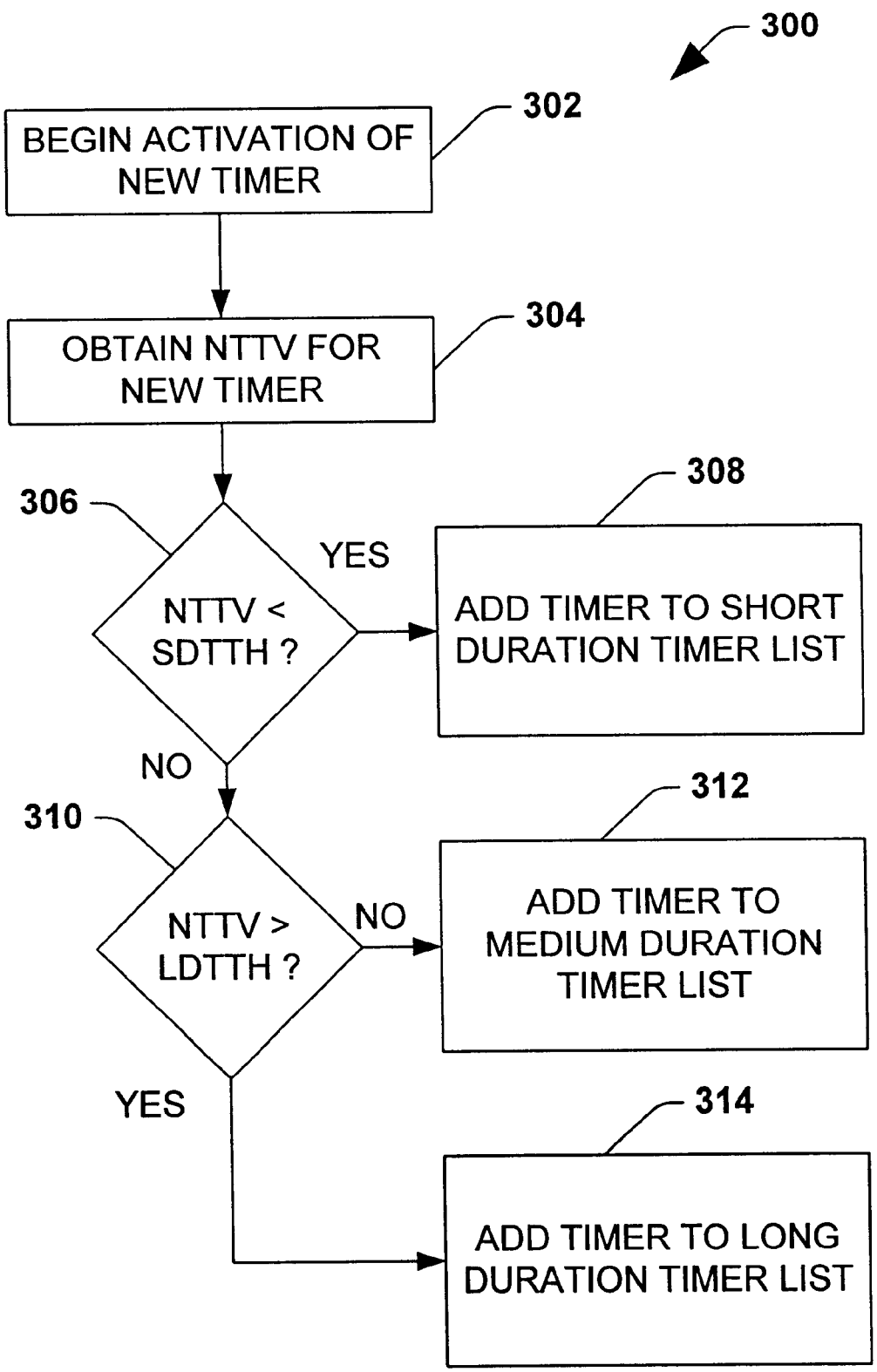
FIG. 6a is a flow diagram illustrating the activation of a new timer according to the present invention.

As new timers are allocated by the system 60, entries are added to one of the timer lists 70, 80, or 90 according to the timer duration. Referring to FIG. 6a, another aspect of the invention is illustrated wherein a method of activating a new timer 300 begins at step 302. The timer duration NTTV for the new timer is obtained at step 304, after which decision step 306 determines whether NTTV is less than a short duration timer threshold SDTTH. If so, the new timer is added to the short duration timer list 70 at step 308. Because of the method of processing short duration timers in ISR 100 illustrated in FIG. 4a, the addition of a new timer to the short duration timer list 70 involves adding the NTTV value to the list 70 as an SDTTV, as in FIG. 3a. If NTTV is greater than or equal to SDTTH, decision step 310 determines whether NTTV is greater than a long duration timer threshold LDTTH. If not, the timer is added to the medium duration timer list 80 at step 312. If NTTV is greater than LDTTH, the timer is instead added to the long duration timer list 90 at step 314.

Figure 6B:
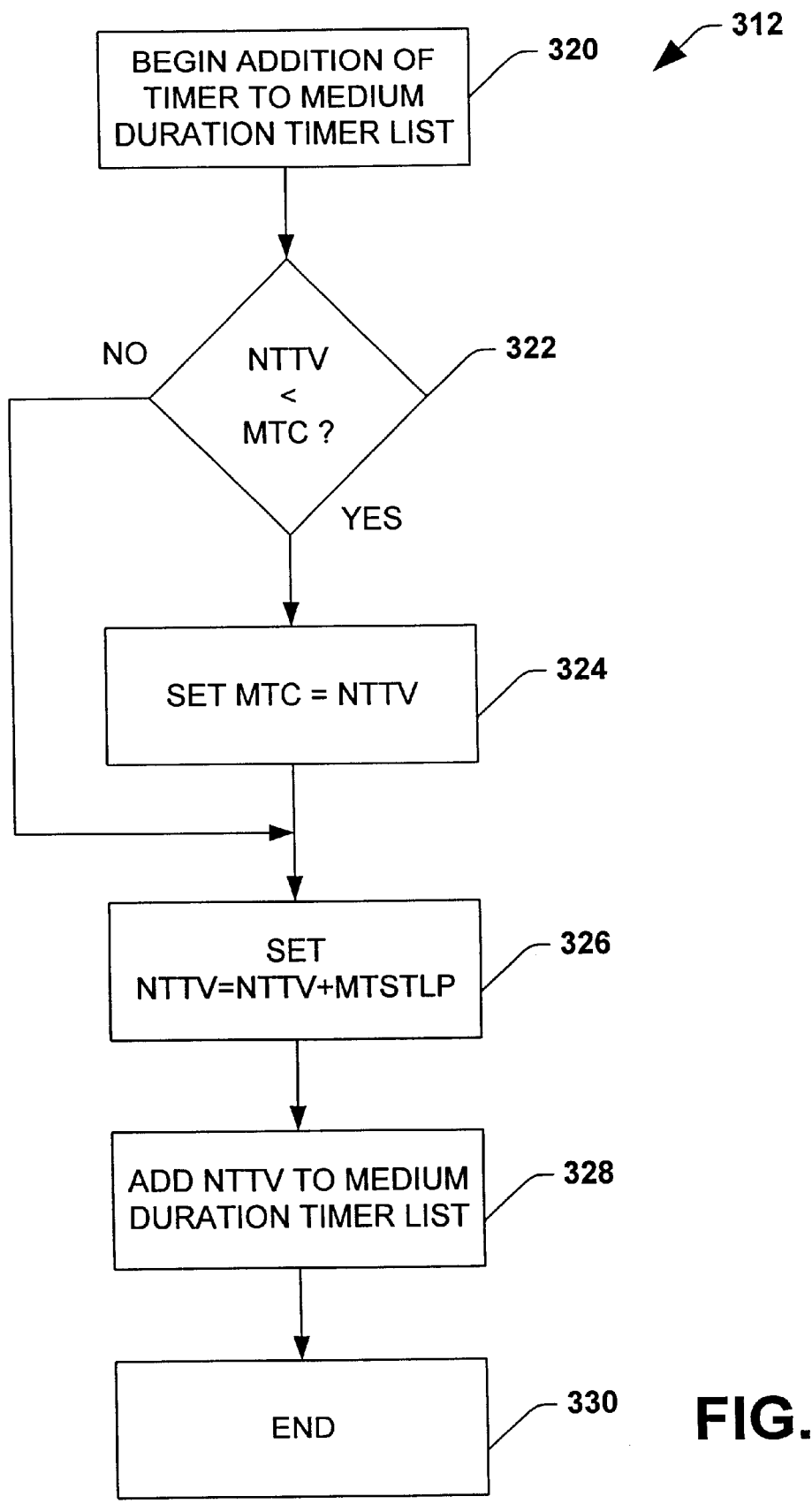
FIG. 6b is a flow diagram illustrating another aspect of the activation of a new timer according to the invention.

Referring also to FIG. 6b, the method 312 of adding a new timer to the medium duration timer list 80 is illustrated beginning at step 320. Decision step 322 next determines whether NTTV is less than MTC. If so, the MTC for the medium duration timer list 80 is set to NTTV at step 324, meaning that the new timer will expire or time out before any of the other active timers presently in the list 80. In either case, step 326 then scales the new timer duration value NTTV by adding MTSTLP to it. The NTTV is then added to the medium duration timer list 80 at step 328, including an entry MDTTV in the list 80 having a value of NTTV, and the activation method 312 ends at step 330. The medium duration timer list 80 is unordered, significantly reducing the processing time needed to add or reactivate a timer when compared with prior methods which needed to search an ordered list to find the appropriate location to insert the timer within the list. The invention thus accomplishes a major overhead reduction for watchdog type timers which generally never run to timeout, but rather are retriggered at a rate that is a small fraction of their timeout value, thus requiring them to be removed from and reinserted into an ordered list each time they are retriggered.

Figure 6C:
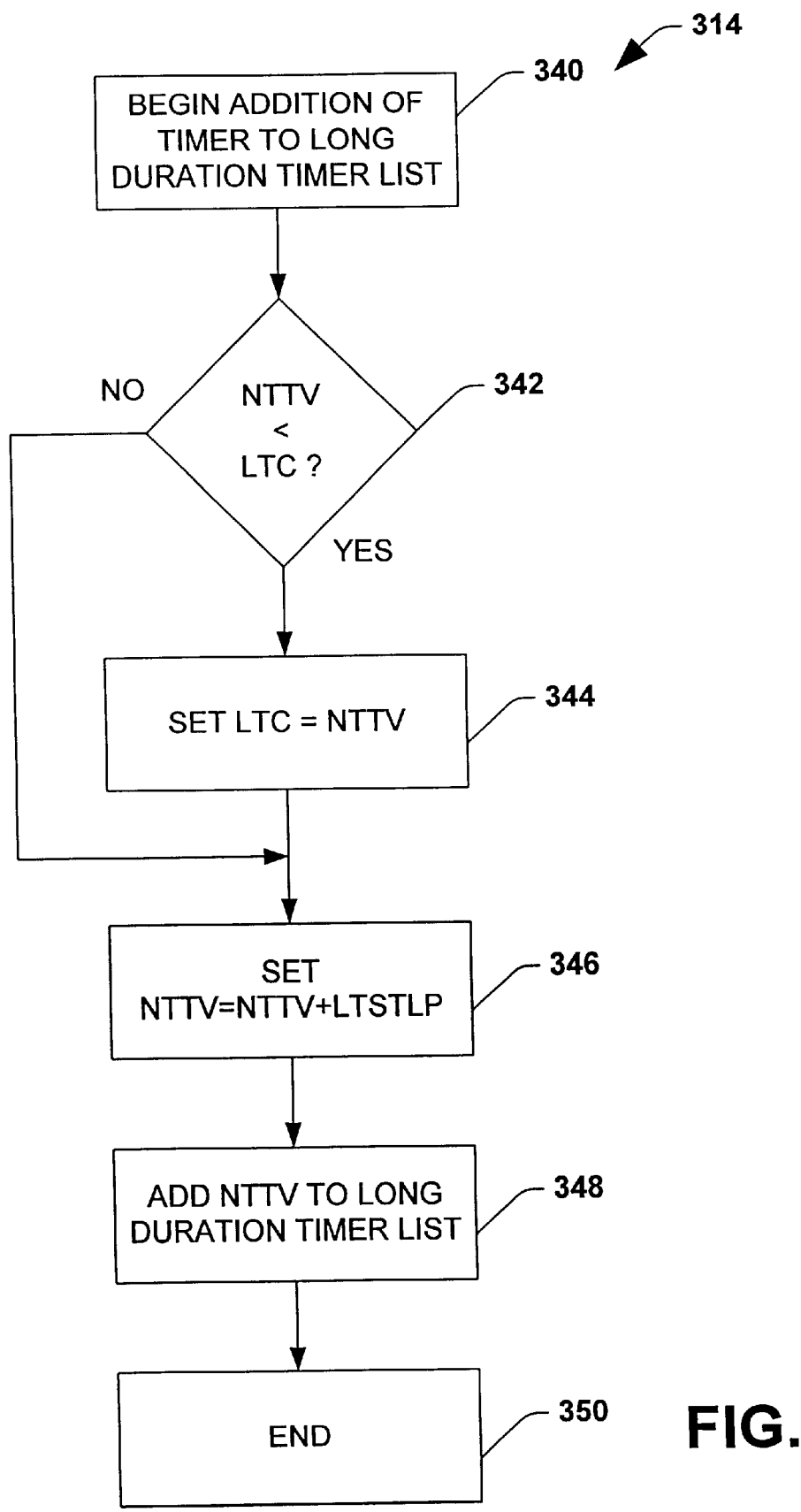
FIG. 6c is a flow diagram illustrating another aspect of the activation of a new timer according to the invention.

In similar fashion, new timers may be added to the long duration timer list 90. Referring to FIG. 6c, the method 314 of adding a new timer to the long duration timer list 90 is illustrated beginning at step 340. Decision step 342 next determines whether NTTV is less than LTC. If so, the LTC for the long duration timer list 90 is set to NTTV at step 344, meaning that the new timer will expire or time out before any of the other active timers presently in the list 90. In either case, step 346 then scales the new timer duration value NTTV by adding LTSTLP to it. The NTTV is then added to the long duration timer list 90 at step 348, including an entry LDTTV in the list 90 having a value of NTTV, and the activation method 314 ends at step 350. The long duration timer list 90 is unordered, significantly reducing the processing time needed to add or reactivate a timer when compared with prior methods which needed to search an ordered list to find the appropriate location to insert the timer within the list. The invention thus accomplishes a major overhead reduction for watchdog type timers which generally never run to timeout, but rather are retriggered at a rate that is a small fraction of their timeout value, thus requiring them to be removed from and reinserted into an ordered list each time they are retriggered.

Figure 7A:
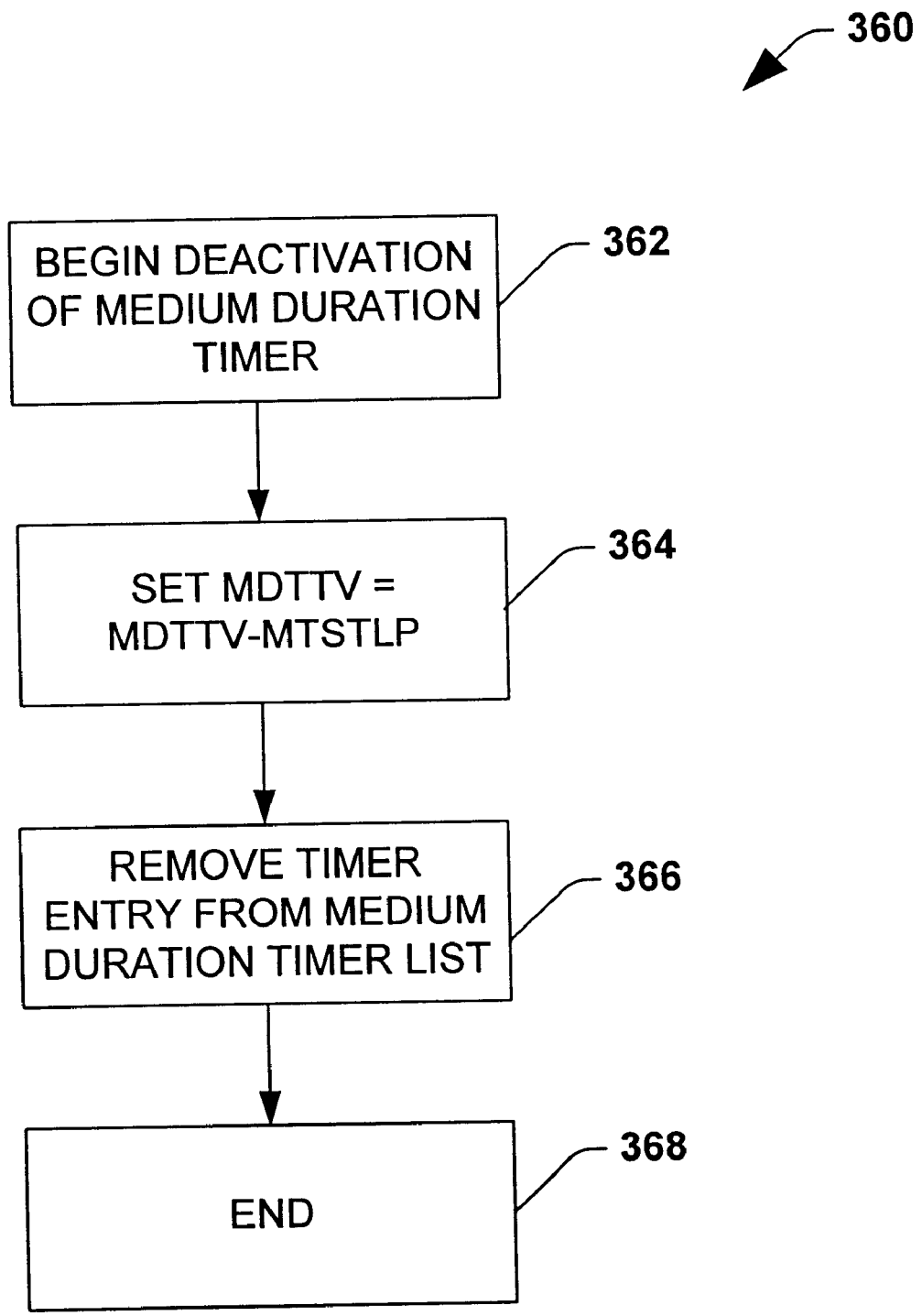
FIG. 7a is a flow diagram illustrating an exemplary method for deactivation of a timer according to the invention.
Figure 7B:
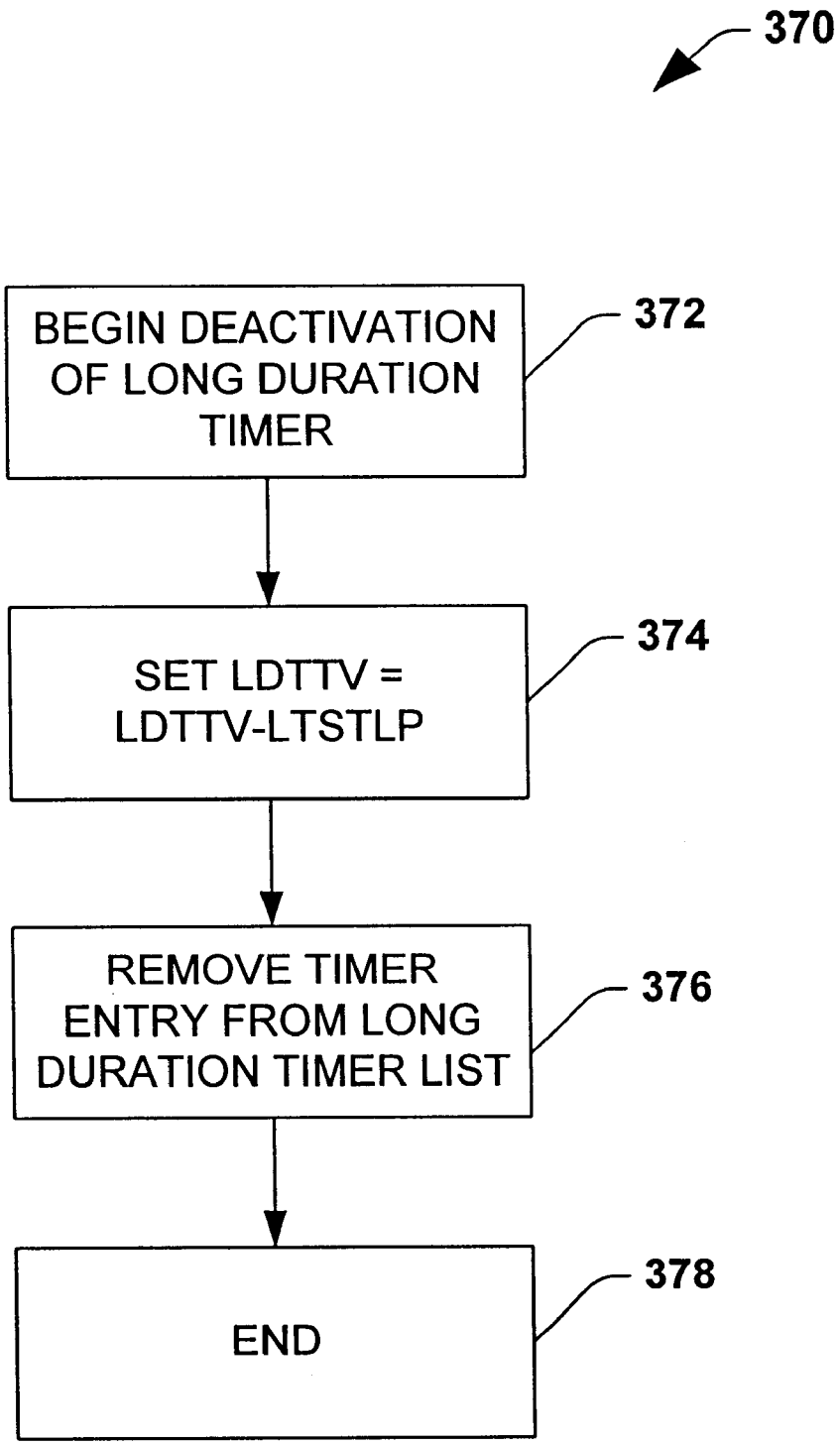
FIG. 7b is a flow diagram illustrating another aspect of the deactivation of a timer according to the invention.

Deactivation of a timer in the short duration timer list 70 merely involves removal of the corresponding SDTTV from the list. Referring to FIGS. 7a and 7b, the deactivation of a timer in the medium or long duration timer lists 80 or 90 is illustrated. In FIG. 7a, the deactivation 360 of a medium duration timer begins at step 362, after which the scaling value MTSTLP is subtracted from the MDTTV at step 364. This provides the actual time remaining until the timer would have timed out, so that if the timer is subsequently reactivated, the actual time remaining is known. The timer entry is then removed from the medium duration timer list 80 at step 366, and the deactivation 360 ends at step 368. In similar fashion, timers may be deactivated from the long duration timer list 90, as illustrated in FIG. 7b. The deactivation 370 of a long duration timer begins at step 372, after which the scaling value LTSTLP is subtracted from the LDTTV at step 374. The timer entry is then removed from the long duration timer list 90 at step 376, and the deactivation 370 ends at step 378.

In order to further illustrate the various aspects of the invention, an example is provided in FIGS. 8a–8l, in which the methods and system of the present invention are illustrated with respect to an exemplary medium duration timer list 400 in memory 62. In FIG. 8a, the list 400 includes 4 active medium duration timer entries with timer timeout values MDTTV1, MDTTV2, MDTTV3, and MDTTV4 having values of 17, 19, 3, and 5, respectively. In this example, the timer interrupt service routine (ISR) 100 of FIGS. 4a–4c runs every time the timer interrupt signal 64 (timer clock) is received by the microprocessor 12 from the free running hardware timer 10 in FIG. 2a, and the medium duration timer service task 130 associated with the medium duration timer list 400 is executed when the medium timer counter MTC reaches zero. As described supra with respect to FIG. 4b, each time the ISR 100 runs, the medium time since timer list processed MTSTLP is incremented at step 122, and the medium timer counter MTC is decremented at step 124. In FIG. 8a, the MTC and MTSTLP have values of 3 and zero, respectively, indicating that the list 400 has just been processed by task 130, and will be processed again in 3 timer clocks.

In FIG. 8b, a timer clock has been received, and the ISR 100 has decremented MTC to 2 and incremented MTSTLP to 1. After another timer clock, the MTC is further decremented to 1 and the MTSTLP is incremented to 2, as illustrated in FIG. 8c. As the MTC has not yet reached zero (see decision step 126 of ISR 100 in FIG. 4b), the entries MDTTV1, MDTTV2, MDTTV3, and MDTTV4 remain at 17, 19, 3, and 5, respectively, because the timer service task 130 has not been run. In FIG. 8d, another timer clock has occurred, and MTC has been decremented to zero, with MSTSLP incremented to 3, thus indicating that the medium duration timer list 400 has not been processed for 3 timer clocks, and that the medium duration timer service task 130 will be called from ISR 100.

Referring also to FIGS. 5a and 8e, the timer task 130 begins execution at step 200. The first entry in the list 400 is MDTTV1, which is greater than MTSTLP. Step 208 accordingly sets MDTTV1=MDTTV1−MTSTLP=17−3=14, with the new medium timer counter NMTC being set to 14 at step 212. MDTTV2 is the next entry obtained from the list 80 at step 216, and is also greater than MTSTLP. Thus, step 208 sets MDTTV2=MDTTV2−MTSTLP=19−3=16. Since MDTTV2 is greater than NMTC, NMTC remains at 14, and the next entry MDTTV3 is obtained from the list 400 at step 216.

MDTTV3, having a value of 3, has expired or timed out, whereby decision step 206 determines that MDTTV3 is not greater than MSTSLP. Step 220 then performs the timeout processing associated with MDTTV3, which is subsequently removed from the list 400 at step 224. Next, MDTTV4 is obtained at step 216 from the medium duration timer list 400, after which MDTTV4 is set to MDTTV4−MTSTLP=5−3=2 at step 208 according to the task 130 of FIG. 5a. Because MDTTV4 is now less than NMTC, NMTC is set to 2 at step 212. Thereafter, MTC is set to NMTC=2, and MTSTLP is reset to zero at step 230, before the task 130 ends at step 232. FIG. 8e shows the medium duration timer list 400 after completion of the task 130, wherein MTC and MTSTLP have values of 2 and 0, respectively, MDTTV3 has been removed from the list 400, and MDTTV1, MDTTV2, and MDTTV4 have values of 14, 16, and 2, respectively.

Referring now to FIG. 8f, another timer clock has occurred, whereby the timer ISR 100 has incremented MTSTLP to 1 at step 122 and decremented MTC to 1 at step 124. Because the task 130 is not executed at this time, the values for MDTTV1, MDTTV2, and MDTTV4 remain at 14, 16, and 2, respectively. Referring also to FIG. 8g, after another timer clock ISR 100 decrements MTC to 0 and increments MTSTLP to 2, whereby the service task 130 is called by ISR 100. The steps of FIG. 5a are executed according to the method discussed supra, during which the processing associated with timer MDTTV4 is performed, since this timer has now timed out, and the values in the list 400 for MTC, MTSTLP, MDTTV1 and MDTTV2 are set to 12, 0, 12, and 14, respectively.

Referring to FIG. 8i, before another timer clock, a new medium duration timer MDTTV5 having a timeout duration NTTV of 16 is activated according to the method 300 of FIG. 6a and step 312 of FIG. 6b. MDTTV5 is added to the unordered timer list 400 as illustrated in FIG. 8i. In this regard, it will be noted that the addition of a timer (e.g., MDTTV5) having a timeout value greater than MTC, has the absolute minimum processing overhead of nothing more than adding it to the unordered list 400. Thereafter another timer clock occurs, and MTC and MTSTLP are set to 11 and 1, respectively, via the ISR 100, as illustrated in FIG. 8j. Since the timer service task 130 was not called be the ISR 100, the values of MDTTV1, MDTTV2, and MDTTV5 remain at 12, 14, and 16, respectively.

Prior to another timer clock occurrence, a new medium timer MDTTV6 is activated according to method 300 of FIG. 6a. The new timer has a duration NTTV of 4, thus MTC is set to 4 at step 324, and the value MDTTV6 is set to 5 in step 326, since MTSTLP is 1. Upon activation of the new timer, the medium duration timer list 400 is updated as shown in FIG. 8k, wherein MTC and MTSTLP have values of 4 and 1, respectively, and MDTTV1, MDTTV2, MDTTV5, and MDTTV6 have values of 12, 14, 16, and 5, respectively. Thereafter, as illustrated in FIG. 8l, timer MDTTV2 is removed from the list 400, according to the medium timer deactivation method 360 of FIG. 7a. MTSTLP is subtracted from the removed timer MDTTV2 duration value at step 364 of the deactivation method 360, so that if the timer needs to be reactivated subsequently, the actual time remaining before timeout thereof is known. It will be appreciated that the deactivation methods illustrated in FIGS. 7a and 7b do not include readjusting MTC or LTC where the deactivated timer had the shortest time remaining to timeout. The illustrated methods thereby reduce the processing overhead associated with deactivating timers, although other implementations are possible.

The example of FIGS. 8a–8l illustrates several of the advantageous aspects of the present invention. In particular, the usage of more than one timer lists allows different processing techniques to be employed for different timer durations. The selective execution of the medium and short duration timer service tasks 130 and 150 from the ISR 100 reduces the timer processing overhead associated with each timer clock. Whereas prior methods and systems required each timer list entry be decremented each timer clock period, the present invention does not, thus reducing overhead. In addition, the overhead to add and remove timers from the lists 70, 80, and 90 is minimized because these lists are unordered. Furthermore, the overhead is not significantly increased with an increase in the total number of active medium or long durations timers in the corresponding lists 80 or 90.

Although the invention has been shown and described with respect to a certain aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary implementations of the invention. In this regard, it will also be recognized that the invention includes a system as well as a computer-readable medium having computer-executable instructions for performing the steps of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A method for processing timers having timer duration counts associated therewith, comprising:
   providing a plurality of timer lists, at least one timer list having a service task, a counter, and a scaling variable associated therewith;
   adding timer entries to the timer lists based on duration;
   scaling the timer entries in the at least one timer list based on the scaling variable;
   periodically executing a timer service routine; and
   selectively executing at least one timer list service task based on a counter associated with the at least one timer list.

2. The method of claim 1, wherein the at least one timer list comprises timers of duration in a duration range associated with the at least one timer list.

3. The method of claim 1, further comprising adding the scaling variable to at least one timer duration count.

4. The method of claim 1, wherein periodically executing a timer service routine comprises:
   providing an interrupt; and
   executing the timer service routine based on the interrupt.

5. The method of claim 4, wherein periodically executing a timer service routine further comprises modifying the counter.

6. The method of claim 1, wherein periodically executing a timer service routine further comprises modifying the counter.

7. The method of claim 6, wherein modifying the counter comprises decrementing the counter.

8. The method of claim 7, wherein periodically executing a timer service routine further comprises incrementing the scaling variable.

9. The method of claim 1, wherein periodically executing a timer service routine further comprises incrementing the scaling variable.

10. The method of claim 1, further comprising: providing at least two timer lists, at least one timer list having a service task, a counter, and timer duration counts associated therewith, and adding a new timer to one of the at least two timer lists based on a duration associated with the new timer.

11. A method for processing a timer list having a service task, a counter, and timer duration counts associated therewith, comprising:
    periodically executing a timer service routine; and
    selectively executing the service task by setting the counter based on lowest timer duration count associated with the timer list.

12. The method of claim 11, wherein periodically executing a timer service routine comprises incrementing a scaling variable associated with the timer list, and wherein selectively executing the service task comprises selectively modifying the timer duration counts based on the scaling variable, and subsequently setting the scaling variable to zero.

13. The method of claim 12, further comprising adding new timers to the timer list based on the scaling variable.

14. The method of claim 13, wherein adding new timers comprises selectively modifying the counter based on a duration count associated with a new timer.

15. The method of claim 14, further comprising scaling the new timers based on the scaling variable.

16. A method for processing a timer list having a service task, a counter, and timer duration counts associated therewith, comprising:
    periodically executing a timer service routine;
    selectively executing the service task based on the counter; and
    adding new timers to the timer list based on a scaling variable.

17. A method for processing a timer list having a service task, a counter, and timer duration counts associated therewith, comprising:
    periodically executing a timer service routine;
    selectively executing the service task based on the counter; and
    scaling timer entries in the timer list based on a scaling variable.

18. A method for adding a new timer to a timer list, comprising:
    setting a counter associated with the timer list equal to a duration value associated with the new timer if the duration value is less than the counter; and
    adding the value of a scaling variable to the duration value.

19. A method for processing timers having timer duration counts associated therewith, comprising:
    providing a plurality of timer lists, at least one timer list having a service task, a counter, and a scaling variable associated therewith;
    adding timer entries to the timer lists based on duration;
    scaling the timer entries in the at least one timer list based on the scaling variable;
    periodically executing a timer service routine; and
    selectively executing at least one timer list service task based on a counter associated with the at least one timer list.

20. The method of claim 19, wherein the at least one timer list is unordered.

21. A system for processing timers having timer duration counts associated therewith, comprising:
    means for providing a plurality of unordered timer lists, at least one unordered timer list having a service task, a counter, and a scaling variable associated therewith;
    means for adding timer entries to the unordered timer lists based on duration;
    means for scaling the timer entries in the at least one timer list based on the scaling variable;
    means for periodically executing a timer service routine; and
    means for selectively executing at least one timer list service task based on a counter associated with the at least one unordered timer list.

* * * * *